(12) United States Patent
Schievano

(10) Patent No.: US 6,309,518 B1
(45) Date of Patent: Oct. 30, 2001

(54) SURFACE-TREATMENT PLANT

(75) Inventor: Fervino Schievano, Padua (IT)

(73) Assignee: C.V.G. Centro Veneto Galvanico S.R.L., Vigonza (IT)

( * ) Notice: Subject to any disclaimer, the term of this patent is extended or adjusted under 35 U.S.C. 154(b) by 0 days.

(21) Appl. No.: 09/381,132

(22) PCT Filed: Mar. 19, 1998

(86) PCT No.: PCT/EP98/01568

§ 371 Date: Nov. 16, 1999

§ 102(e) Date: Nov. 16, 1999

(87) PCT Pub. No.: WO98/41676

PCT Pub. Date: Sep. 24, 1998

(30) Foreign Application Priority Data

Mar. 18, 1997 (IT) .............................................. PD97A0054

(51) Int. Cl.[7] .................................................. C25D 17/00
(52) U.S. Cl. ............................................................ 204/202
(58) Field of Search ............................................... 204/202

(56) References Cited

U.S. PATENT DOCUMENTS

| | | | | |
|---|---|---|---|---|
| 1,368,357 | * | 2/1921 | Scholtz | 204/202 |
| 1,819,603 | * | 8/1931 | Hughes | 204/202 |
| 5,755,935 | * | 5/1998 | Jackson et al. | 204/202 |
| 5,810,987 | * | 9/1998 | Opitz | 204/512 |

* cited by examiner

*Primary Examiner*—Kathryn Gorgos
*Assistant Examiner*—Erica Smith-Hicks
(74) *Attorney, Agent, or Firm*—Sughrue, Mion, Zinn, Macpeak & Seas, PLLC (57) ABSTRACT

A surface-treatment plant, particularly for galvanic treatments, includes at least one tank (3) for holding a bath (B) for treating pieces (P) to be treated by immersion therein, and a continuous conveyor device (5) having an active pass at least a portion of which is immersed in the tank (3) in order to move the pieces being treated from an end at which the pieces enter the bath to an end at which the pieces leave the bath.

18 Claims, 7 Drawing Sheets

SURFACE-TREATMENT PLANT

TECHNICAL FIELD

The present invention relates to a surface-treatment plant, particularly for galvanic treatments, comprising at least one tank for holding a treatment bath in which the pieces to be treated are immersed.

BACKGROUND ART

Known systems for the surface treatment of pieces such as metal pieces comprise a series of tanks containing baths, for example, electrolytic or chemical baths, arranged in succession in a manner such that the pieces coming out of one bath are immersed in the next bath. For processes for cleaning pieces, baths, for example, degreasing baths, washing baths, pickling baths, etc., are arranged in succession.

Surface-treatment plants having the features outlined above are known from U.S. Pat. No. 1,368,357 and U.S. Pat. No. 1,819,603.

For electroplating processes, nickel-plating baths, galvanizing baths, or baths for similar processes for the surface application of metallic coatings are provided in addition to cleaning baths.

In order to immerse the pieces to be treated in the series of baths provided for the treatment, the pieces are first placed in containers which are then moved from one tank to another by means of overhead transfer devices which immerse the containers in the various baths and remove them therefrom according to the predetermined cycles of the process.

However, known transfer devices have the disadvantage of requiring a large amount of space since the containers can be moved by the overhead devices from one tank to another only if the tanks are arranged adjacent one another, generally at a single level or in a single working plane. Moreover, the insertion of the pieces to be treated in the containers and their removal therefrom upon completion of the treatment take place manually so that operators are required for these operations.

The success of the treatment on these pieces may be compromised by vigorous rolling of the pieces to be treated by the structure of the containers.

DISCLOSURE OF THE INVENTION

In order to overcome these problems, the subject of the invention is a plant of the type indicated above.

By virtue of this concept, it is possible to produce plants for the surface treatment of pieces in which the pieces can be supplied to the plant and discharged therefrom completely automatically. Moreover, the tanks of the plant can be arranged at different levels so as to take up less space and to facilitate the extraction of gases and vapours liberated during the treatment processes. Moreover, the pieces treated advantageously undergo relative movements during their transfer by conveyor means so that the treatment process can be performed more effectively and over the entire surfaces of all of the pieces treated.

According to a preferred characteristic of the invention, the conveyor means are constituted by a belt or plate conveyor which has a series of translating elements extending transverse the direction of advance of the conveyor and driven relative to a surface for supporting the pieces in order to transfer the pieces into the corresponding tank and from one tank of the plant to another.

It is thus possible to ensure the correct transfer of the pieces even along considerably inclined ramps of the conveyor.

According to a particularly advantageous characteristic of the invention, a sheet-like element such as a cloth, a flexible sheet or a net is arranged bearing on the active pass of the conveyor so as to engage for sliding on the tops of the translating elements and to form a respective loop between each pair of adjacent translating elements, each of these loops being intended to house at least one piece to be treated; the sheet-like element is restrained relative to the tanks so that the pieces are rolled and moved forward on top of the sheet-like element as a result of the advance of the translating elements beneath the flexible sheet-like element.

This ensures that the pieces roll continuously during their treatment in the various baths, which considerably improves the overall reliability of the treatment performed and reduces the time spent by the pieces in the baths.

BRIEF DESCRIPTION OF THE DRAWINGS

Further characteristics and advantages of the invention will become clearer from the following detailed description given with reference to the appended drawings, provided purely by way of non-limiting example, in which.

BEST MODE OF CARRYING OUT THE INVENTION

With reference to the appended drawings, a plant for the surface treatment of pieces is generally indicated 1. The plant 1 comprises a plurality of tanks 3 each of which contains a respective liquid or bath B suitable for treatments of a chemical or electrolytic nature for treating the pieces P, for example, a degreasing bath, a washing bath, a pickling bath, or a bath for the surface application of a metallic or non-metallic coating. In the case of electrolytic-treatment baths B, cathodes and anodes are arranged in the tanks, enabling the electrolytic process to be performed.

The tanks 3 may be distributed at a single working level, but it is advantageous to arrange them so as to occupy a plurality of levels one above another so that the plant 1 can take up a smaller space in plan. This facilitates the provision of extraction systems for the gases and vapours which are evolved in a more localized manner during the treatment process because the tanks 3 are grouped together.

Figure 1:
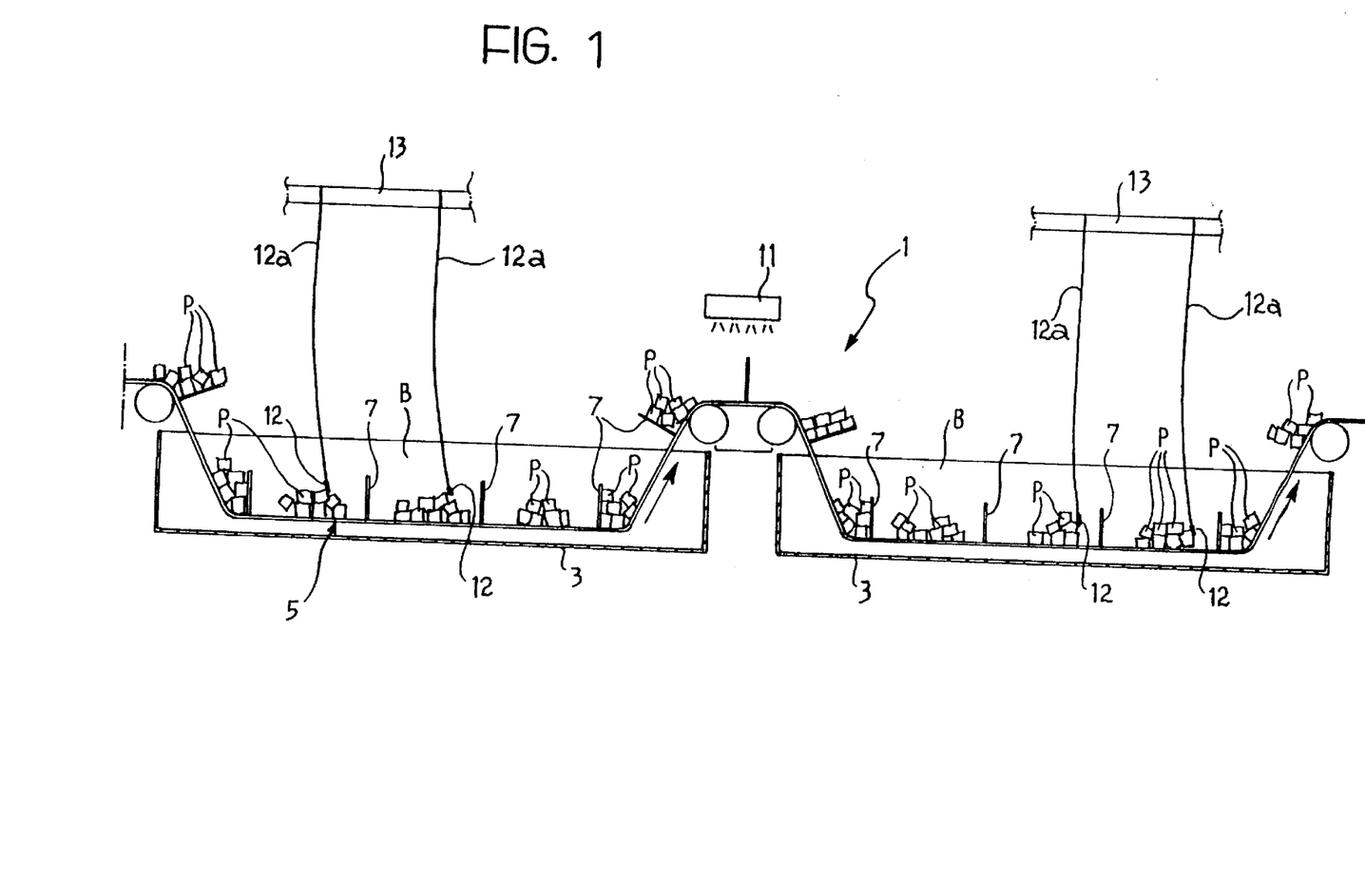
FIG. 1 is a schematic side elevational view of part of a plant for the surface treatment of pieces, formed in accordance with the invention.

With particular reference to FIG. 1, a continuous conveyor device 5 for the pieces P is associated with at least a plurality of tanks 3, but preferably with all of the tanks 3 of the plant 1. This device may be formed by a conveyor having an active pass with one or more consecutive portions immersed in the baths B of the tanks 3 with which it is associated. Each immersed portion of the conveyor 5 advantageously has a first inclined portion 5 descending into the respective bath B and a final portion, which is also inclined and which ascends out of the bath B. Moreover, the various immersed portions of the conveyor 5 are connected to one another by portions disposed above the level of the liquid in the baths B to allow the conveyor 5 to pass over the side walls of the tanks 3.

Guide means associated with the conveyor 5 guide it along its portions above the liquid level, and along its emergent, descending, immersed and ascending portions. These guide means, which are generally of known type, may include transmission rollers or rails for guiding the sides of the conveyor 5.

Figure 6:
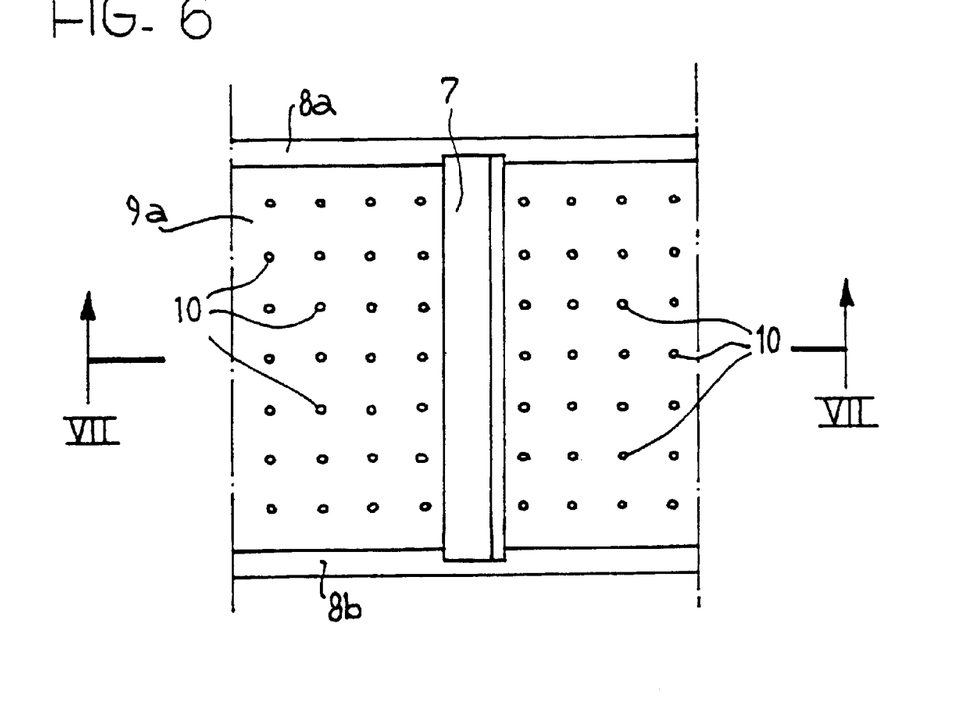
FIG. 6 is a partial plan view of a detail of the plant of the preceding drawings.
Figure 7:
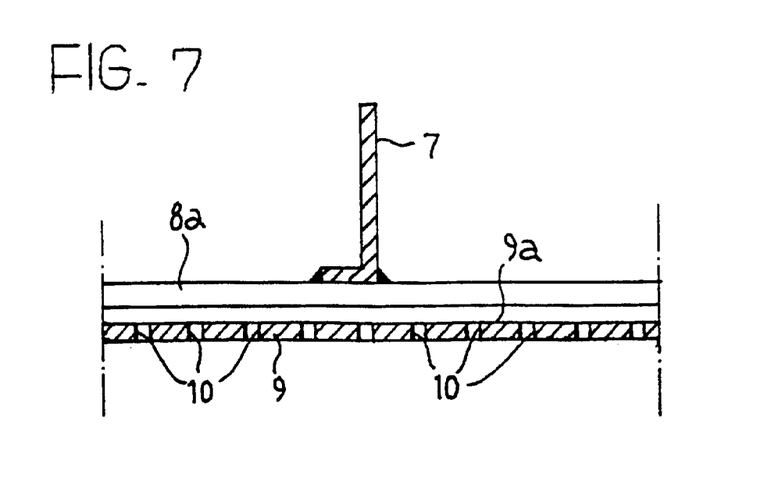
FIG. 7 is a section taken on the line VII—VII of FIG. 6.

To favour the transfer of the pieces P by the conveyor 5, it has a series of translating elements arranged at regular intervals and formed, for example, by perpendicular walls which extend transverse the direction of advance of the conveyor 5 and which are joined together at their opposite ends by respective belts, chains or other similar means. With reference to FIGS. 6 and 7, the translating elements 7 are constituted by a plurality of L-shaped sections having opposite ends fixed to corresponding drive belts 8a, b of the conveyor 5. A plate-like body 9 mounted beneath the belts 8a, b has a surface 9a constituting a bearing surface for the pieces P moved by the translating elements 7 when the conveyor 5 is in motion. The plate-like body 9 is preferably perforated with a plurality of through-holes, all indicated 10, for ensuring an improved flow of current between the anode and the cathode and more rapid run-off of the liquid of the bath B from the surface 9a, particularly in the portions of the conveyor disposed above the liquid level.

Figure 2:
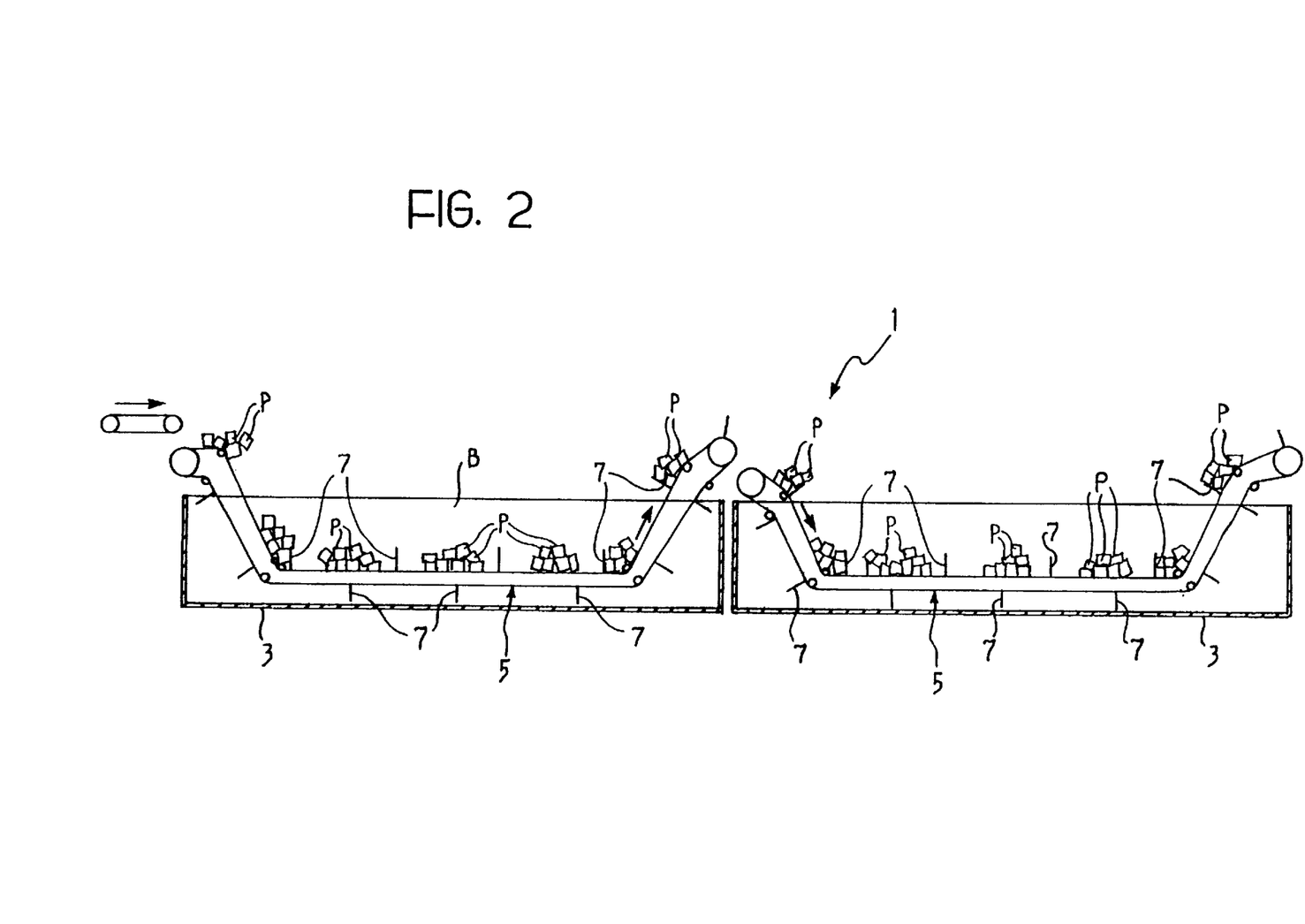
FIG. 2 is a schematic side elevational view of a plant similar to that of FIG. 1, having a device according to a variant of the invention.

FIG. 2 shows a variant of the plant of FIG. 1 in which each tank 3 has a single endless conveyor 5 having an initial portion descending into the bath B and a portion, which is also inclined and which ascends out of the bath B. Between these portions, the conveyor 5 has a portion which is immersed in the tank 3. The arrangement of the conveyors 5 between adjacent tanks is such that the pieces transferred to the output portion of one conveyor are discharged onto the initial portion of the adjacent conveyor 5. Alternatively, auxiliary belt conveyors are interposed between the adjacent conveyors 5 for the transfer of the pieces between tanks 3 arranged in succession.

According to the nature of the baths used, devices 11 may be provided for washing the pieces in the regions of the portions disposed above the liquid level at the output from one tank and at the input to the next tank; these devices are shown schematically in FIG. 1.

For electrolytic electroplating baths, there is provision for an electric current to be passed through the pieces P by a series of electrodes 12 immersed in the bath B by means of flexible wires 12a of which the opposite ends to the electrodes are fixed to a support element 13 arranged above the tank 3 (FIG. 1). Each electrode 12 is thus kept in contact with the pieces P for a portion of the advance of the conveyor 5 and the electrodes are arranged along the tank 3 at intervals such as to ensure that each piece or group of pieces P in contact with one another is continuously in contact with a corresponding electrode 12 so as to ensure that current passes from the electrode to the pieces P throughout the period for which they remain in the bath B.

Figure 3:
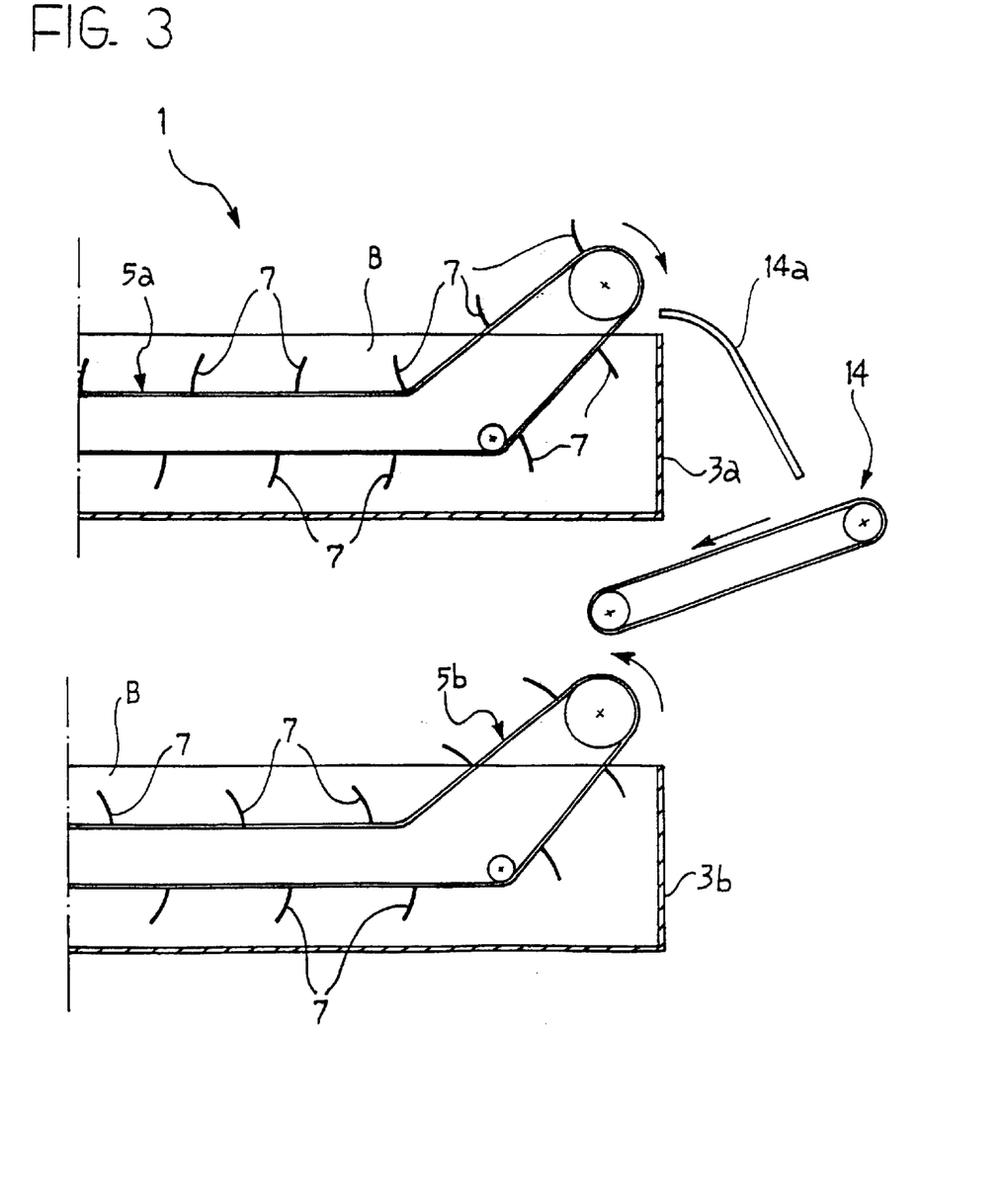
FIG. 3 is a schematic side elevational view of a plant similar to that of the preceding figures, formed in a manner such as to extend at several levels one above another.

FIG. 3 shows part of a plant 1 of which the tanks, indicated 3a, 3b respectively, are arranged at several levels or in several planes one above another. In particular, in this case, each level of the plant 1 has at least one respective conveyor 5a, 5b.

Auxiliary means 14 are provided between one level of the plant 1 and another for delivering the pieces P to another level of the plant 1, for example, to a lower level. The auxiliary means 14 may be formed, for example, by a belt conveyor which is wound around a pair of spacedapart return pulleys and is arranged with its axis generally inclined. A chute 14a is provided for transferring the pieces discharged from the conveyor 5a to the belt 14.

Figure 4:
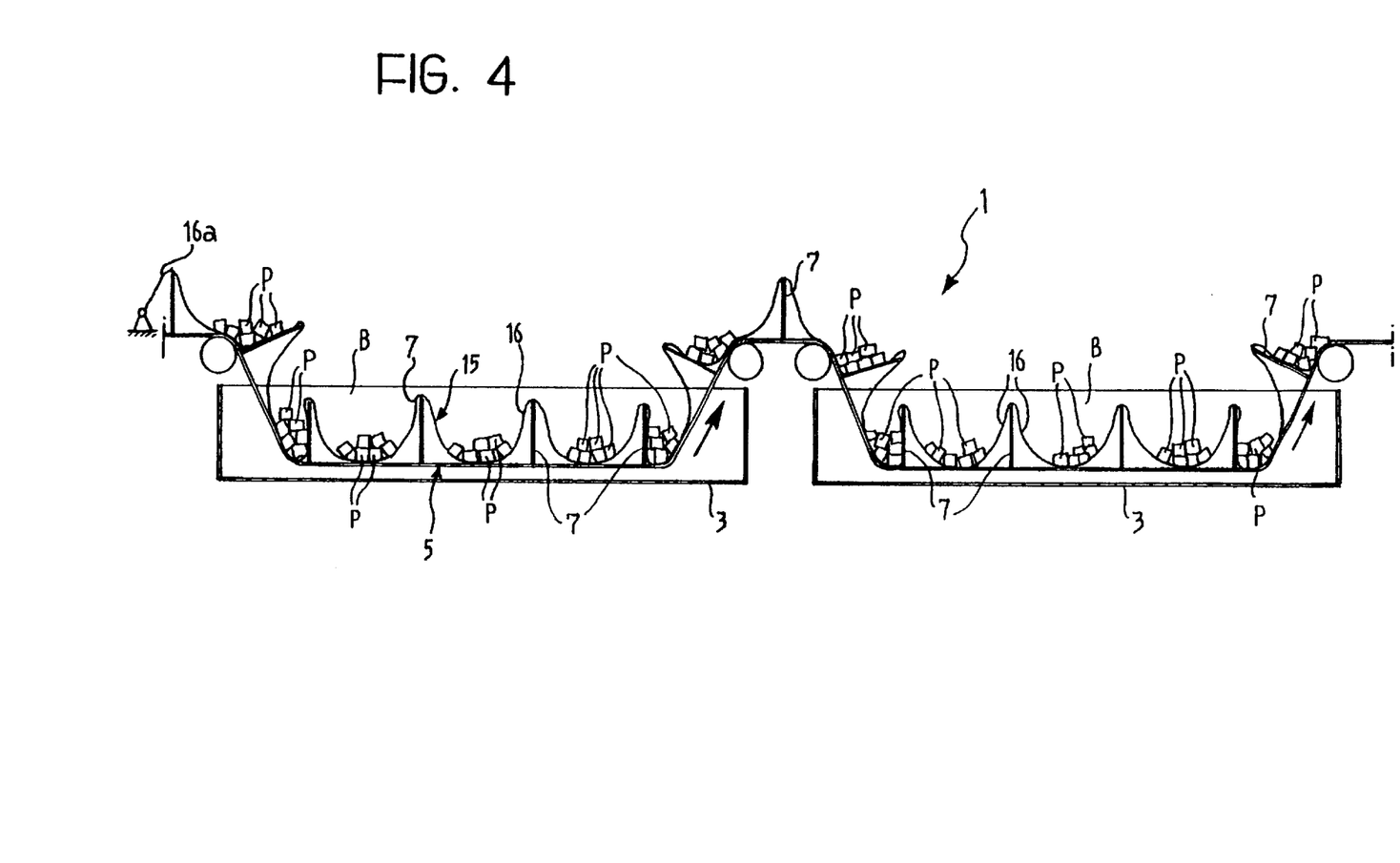
FIGS. 4 and 5 are schematic views of two further embodiments of the plant of the invention, similar to that of FIGS. 1 and 2.

According to a preferred embodiment of the invention and with particular reference to FIG. 4, each conveyor 5 of the plant 1 has a sheet or other flexible sheet-like element 15 such as a cloth or a net of non-conductive material arranged bearing on the conveyor so as to engage for sliding on the tops of the walls 7. The sheet 15 may advantageously be formed by a fabric made of polypropylene fibres, for example, of the type known by the registered name Merak­lon.

The sheet 15 is arranged loosely over the walls 7 so as to form a respective loop 16 for housing pieces P between each pair of successive walls 7. Moreover, the sheet 15 is restrained relative to the tanks 3 of the same level so as not to be pulled along by the movement of the conveyor 5. It is therefore necessary for the sheet 15 to be connected to a fixed portion of the plant 1 at least at an upstream end 16a thereof, generally transverse the direction of advance of the conveyor 5. Alternatively, and with specific reference to the embodiment of FIGS. 8 and 9, each wall 7 may bear, at its end which is in contact with the cloth 15, a respective roller 20 supported so as to be freely rotatable between shoulders 21 or, preferably, driven so as to rotate with the rolling motion of the contact with the cloth 15, or at a speed slightly greater than the rolling speed. The rollers 20 are driven by respective pinions 22 keyed to respective axial ends thereof and meshed with a rack 23 mounted so as to be stationary relative to the tank. The cylindrical surfaces of the rollers 20 are covered with rubber or other material with a high coefficient of friction; the cylindrical surfaces are protected on the upstream side, with reference to the direction of advance, by the corresponding wall which acts as a wiper. By virtue of the sheet 15 and of the movement of the conveyor 5 beneath it, each loop 16 advances relative to the tanks 3 in a wave-like manner with a translatory motion having a speed equal to the speed of advance of the conveyor 5, whilst the sheet 15 as a whole remains stationary. The pieces P housed in a loop 16 of the sheet 15 are therefore moved forwards relative to the tanks 3 of the respective level of the plant 1 as a result of the advance of the conveyor 5 and are rolled by the movement of the loops 16 along the sheet 15. The entire surface of each piece P is thus exposed to the bath B of each of the tanks 3 so as to be affected in an optimal manner by the respective treatment performed.

Figure 5:
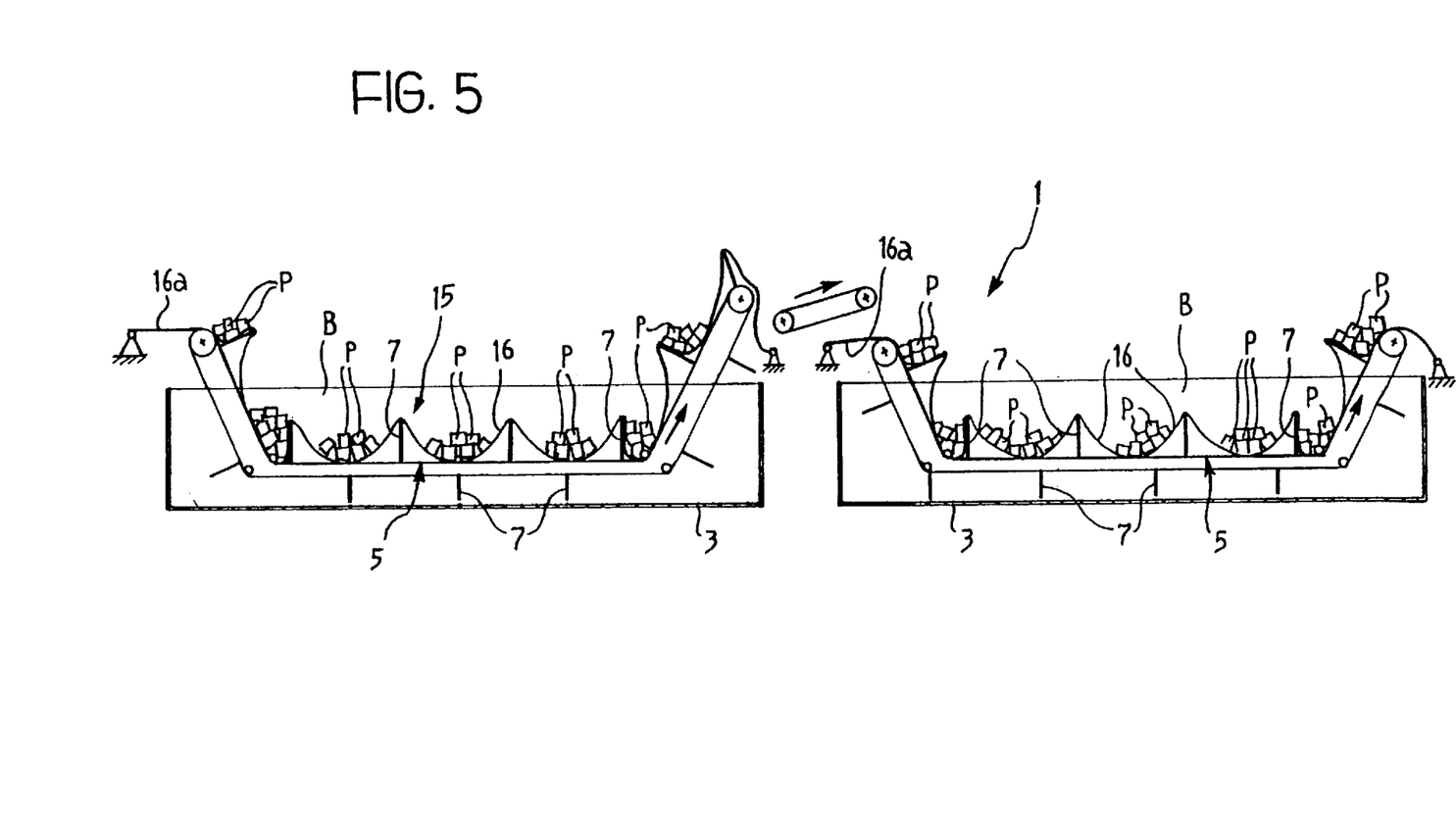
Figure 8:
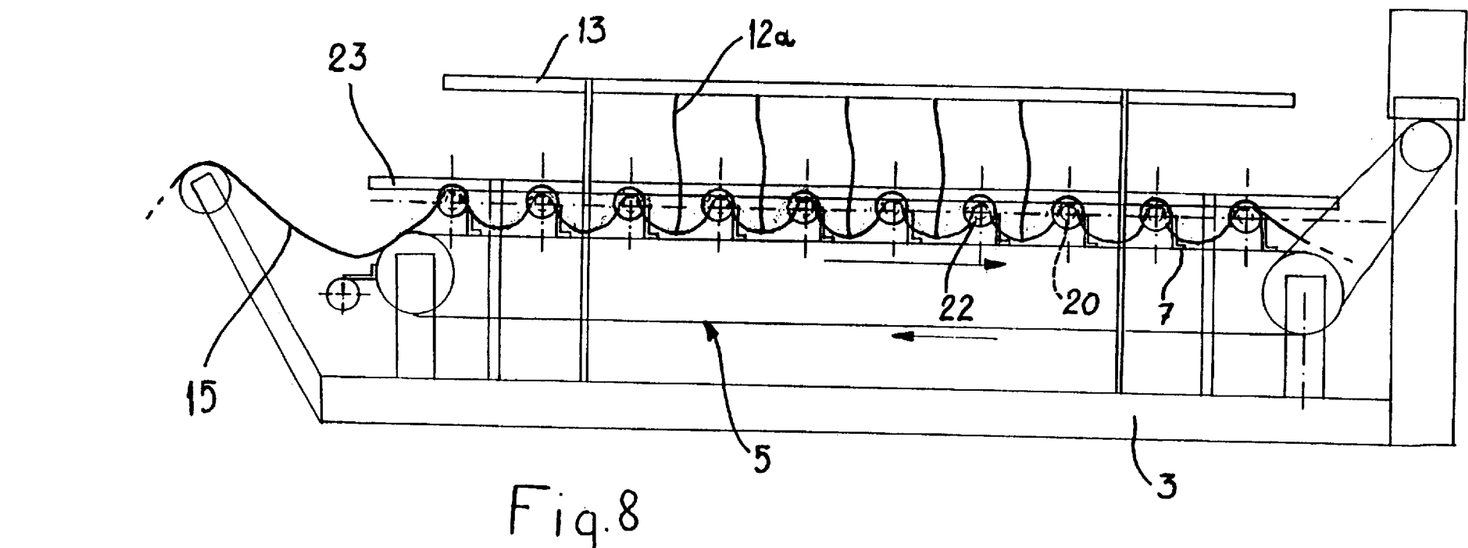
FIG. 8 is a schematic view of a variant of the plant of FIG. 1.
Figure 9:
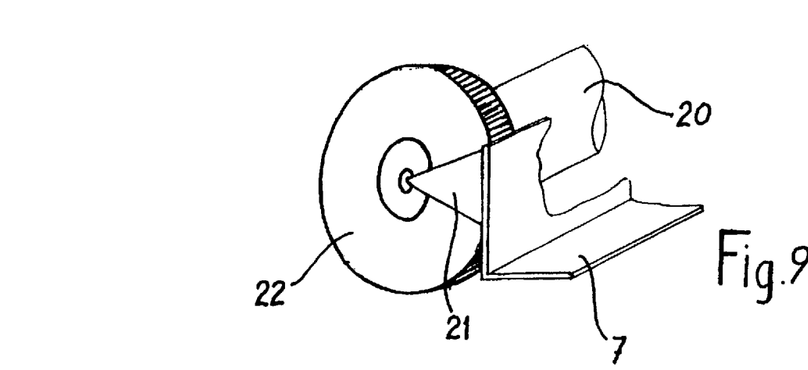
FIG. 9 is a schematic perspective view of a detail of the plant of FIG. 8.

According to a further embodiment of the invention, shown in FIG. 5, the tanks 3 have respective independent conveyors 5 and each conveyor has a respective flexible sheet 15 fixed in the regions of the ends of each tank 3 or restrained as indicated above with reference to the embodiment of FIG. 8. The flexible sheet 15 is arranged on the corresponding conveyor 5 in exactly the same way as in the previous embodiment.

The plant 1 preferably also comprises means for controlling the speed of advance of the conveyor 5 so that these means can be adjusted in order to regulate the time spent by the pieces P in each of the baths B of the tanks 3.

Naturally, the conveyor device 5 according to the invention may also be formed in a manner other than that described, for example, with the use of another conveyor device, for example, of the screw type, or a plurality of such devices arranged in succession along the series of tanks 3 of the plant 1.

What is claimed is:

1. A surface-treatment plant comprising at least one tank for holding a treatment bath in which the pieces to be treated are to be immersed, a conveyor device having an active pass at least a portion of which is immersed in the at least one tank for moving the pieces being treated in the tank from an end at which the pieces enter the tank to an end at which the pieces leave the tank, a plurality of translating elements extending transverse the direction of advance of the active pass characterised in that said conveyor device comprises a flexible sheet element arranged over the translating elements, the sheet element being arranged relative to the tank in a manner such as to engage for sliding on the tops of the translating elements and to form respective loops between pairs of adjacent translating elements in the active portion of the conveyor device, the loops being able to house the pieces being treated, and the sheet element being restrained relative to the tank so as to cause the pieces to roll and to advance on top of the sheet element as a result of the advance of the translating elements of the conveyor device beneath the sheet element.

2. A plant according to claim 1 in which the conveyor device comprises guide members for causing the active pass to be immersed in the bath of the at least one tank and subsequently to emerge therefrom.

3. A plant according to claim 2, comprising a plurality of tanks, the conveyor device being arranged relative to the tanks in a manner such that the pieces being treated are transferred from one tank to another in sequence.

4. A plant according to claim 1, in which each of the tanks is associated with a conveyor device, the conveyor devices being independent of one another and arranged in sequence so as to transfer the pieces to be treated from one respective tank to another.

5. A plant according to claim 1, in which each conveyor device comprises a surface extending beneath the translating elements in order to support the pieces.

6. A plant according to claim 1, characterized in that the translating elements are guided for sliding relative to the support surface during the advance of the conveyor in order to move the pieces in the corresponding tank and/or from the tank into another tank of the plant.

7. A plant according to claim 1, characterized in that the translating elements are formed by walls arranged substantially perpendicular to the active support surface.

8. A plant according to claim 1, characterized in that the flexible sheet element is arranged substantially loosely over the translating elements and the support surface.

9. A plant according to claim 1, characterized in that the flexible sheet element is made of non-conductive material.

10. A plant according to claim 1, characterized in that the flexible sheet element is constituted by a fabric.

11. A plant according to claim 10, in which the fabric is made of polypropylene fibers.

12. A plant according to claim 1, characterized in that means are provided for controlling the speed of advance of the conveyor device so that the time spent by the pieces in the bath of the at least one tank can be regulated.

13. A plant according to claim 1, in which the flexible sheet element is restrained in a substantially stationary condition relative to the corresponding tank.

14. A plant according to claim 1, in which the end of each translating element which is in contact with the flexible sheet element has a respective roller which is driven so as to roll on the surface of contact with the sheet element.

15. A plant according to claim 14, in which the rollers are driven in the direction of rolling so as to restrain the sheet element relative to the tank during the translation of the translating elements.

16. A plant according to claim 15, in which the rollers are supported on the corresponding translating elements and are driven by means of respective pinions keyed to the rollers and meshing with a rack which is stationary relative to the tank.

17. A surface-treatment plant according to claim 1, comprising a plurality of tanks for holding respective treatment baths in which the pieces to be treated are to be immersed, each tank being associated with a respective conveyor device having an active pass at least a portion of which is immersed in the corresponding tank in order to move the pieces being treated in the corresponding tank from an end at which the pieces enter the tank to an end at which the pieces leave the tank, characterised in that the tanks are arranged at a plurality of levels one above another, each level of the plant including at least one of the conveyor devices.

18. A plant according to claim 17, characterized in that auxiliary means are associated with at least one of the levels of the plant for delivering the pieces to another level of the plant.

\* \* \* \* \*